United States Patent
Smith

(10) Patent No.: US 6,661,929 B1
(45) Date of Patent: Dec. 9, 2003

(54) CONTROLLING AN IMAGING ARRAY NOT HAVING BLACK CELLS USING AN ARRAY CONTROLLER THAT IS ADAPTED TO IMAGING ARRAYS HAVING BLACK CELLS

(75) Inventor: Mark T. Smith, San Mateo, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/353,259

(22) Filed: Jul. 14, 1999

(51) Int. Cl.[7] .................... H04N 9/64; H04N 7/20; H04N 5/26; H04N 5/335
(52) U.S. Cl. .................. 382/267; 358/228; 358/482; 358/466; 358/483; 358/468; 358/446; 348/311; 348/241; 348/243; 348/245
(58) Field of Search ................. 358/228, 482, 358/466, 483, 468, 446; 348/311, 241, 243, 245; 382/267

(56) References Cited

U.S. PATENT DOCUMENTS

| | | | | |
|---|---|---|---|---|
| 4,327,378 A | * | 4/1982 | Tanaka et al. ............... 348/365 |
| 4,492,980 A | * | 1/1985 | Harada ....................... 358/213 |
| 5,070,414 A | * | 12/1991 | Tsutsumi .................... 358/466 |
| 5,512,947 A | * | 4/1996 | Sawachi et al. ............. 348/243 |
| 5,612,739 A | * | 3/1997 | Maki et al. .................. 348/311 |
| 5,659,355 A | * | 8/1997 | Barron et al. ............... 348/245 |
| 5,754,422 A | * | 5/1998 | Lowles et al. ................. 700/1 |
| 5,781,312 A | * | 7/1998 | Noda ......................... 358/482 |
| 6,061,092 A | * | 5/2000 | Bakhle et al. ............... 348/243 |
| 6,084,634 A | * | 7/2000 | Inagaki et al. .............. 348/294 |
| 6,400,404 B2 | * | 6/2002 | Hirota et al. ............... 348/314 |

* cited by examiner

Primary Examiner—Scott Rogers
Assistant Examiner—Melanie Vida

(57) ABSTRACT

An imaging system that uses an array controller which is adapted to imaging arrays having black cells to control an imaging array not having black cells. The imaging system includes an array controller that is adapted to process a scan line that includes one or more black pixels. The imaging system includes an imaging array not having black cells that generates a series of pixel data samples in response to light from an image. The imaging system includes circuitry for generating the scan line by synthesizing the black level pixels and combining the black pixels with the series of pixel data samples.

28 Claims, 2 Drawing Sheets

CONTROLLING AN IMAGING ARRAY NOT HAVING BLACK CELLS USING AN ARRAY CONTROLLER THAT IS ADAPTED TO IMAGING ARRAYS HAVING BLACK CELLS

BACKGROUND OF THE INVENTION

1. Field of Invention

The present invention pertains to the field of imaging systems. More particularly, this invention relates to controlling an imaging array not having black cells using an array controller that is adapted to imaging arrays having black cells.

2. Art Background

A variety of imaging systems commonly include an array of photo-sensitive semiconductor cells for obtaining samples of an image. Each cell of such an imaging array usually generates an electrical signal in response to incident light. Typically, the electrical signal generated by a cell represents a pixel data sample from the cell.

Such imaging systems typically include an array controller that provides an interface between the imaging array and a processor that uses the imaging array to obtain samples of an image. Typically, the array controller generates the appropriate clock and control signals needed to obtain pixel data samples from the imaging array. In addition, the array controller usually processes the pixel data samples into a form suitable for use by a processor.

Some imaging arrays include a set of cells that generate black level pixels. One such type of imaging array is commonly referred to as a charge-coupled device (CCD). The black cells in a CCD array are usually cells that are coated with an opaque material. The black level pixels generated by such black cells usually enables a CCD array controller to establish black levels in the electrical signal generated by the CCD and to perform operations such as correlated double sampling.

A relatively wide variety CCD controllers are usually commercially available and at a relatively low cost. It may therefore be advantageous to incorporate CCD controllers into the design of imaging systems that use imaging arrays not having black cells. This would eliminate the costs of providing custom design array controllers to imaging arrays not having black cells. Unfortunately, prior CCD controllers usually do not function correctly if black pixels are not generated by the imaging array. Moreover, the inclusion of black cells in an imaging array wastes cells that could otherwise be available for sampling an image.

SUMMARY OF THE INVENTION

An imaging system is disclosed that uses an array controller which is adapted to imaging arrays having black cells to control an imaging array not having black cells. The imaging system enables the efficient use of imaging arrays by eliminating wasteful black cells and realizes a reduction in the cost of an imaging system by using commercially available array controllers such as CCD controllers.

In one embodiment, the imaging system includes an array controller that is adapted to process a scan line that includes one or more black pixels. The imaging system includes an imaging array not having black cells that generates a series of pixel data samples in response to light from an image. The imaging system includes circuitry for generating the scan line by synthesizing the black pixels and combining the black level pixels with the series of pixel data samples.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
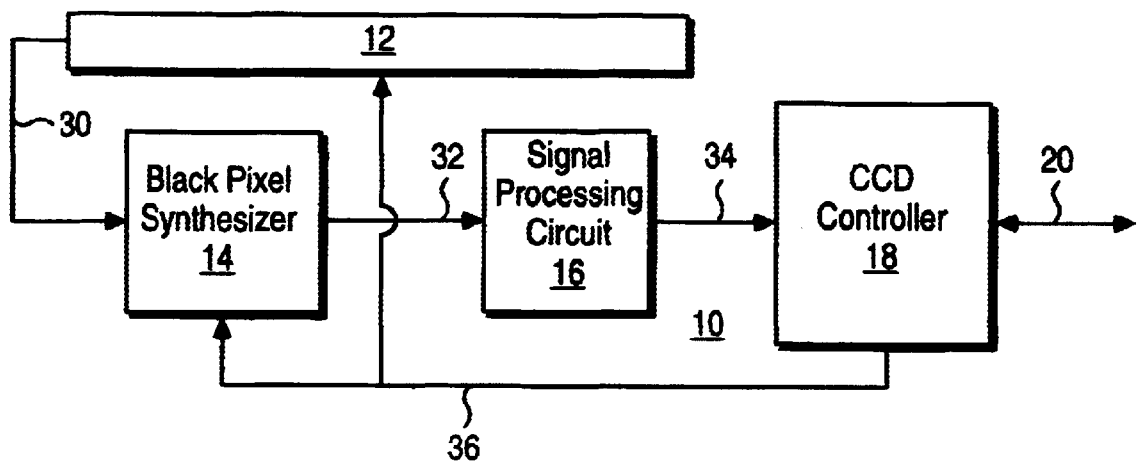
FIG. 1 shows an imaging system according to the present teachings.

FIG. 1 shows an imaging system 10 according to the present teachings. The imaging system 10 includes a imaging array 12 and a CCD controller 18 that controls and obtains data from the imaging array 12. The imaging system 10 includes a black pixel synthesizer 14 that synthesizes black pixels for use by the CCD controller 18.

The imaging array 12 is a linear array of light sensitive semiconductor cells. The imaging array 12 may be referred to as a contact image sensor. Each cell may also be referred to as a pixel. None of the cells in the imaging array 12 are altered to provide black pixels as is the case with the CCD arrays which the CCD controller 18 is designed to control. The elimination of black cells increases the efficiency of the imaging array 12 in sensing an image in that no cells of the imaging array 12 are wasted on providing black pixels to the CCD controller 18.

The imaging array 12 generates a data signal 30 in response to a set of control and clock signals 36 generated by the CCD controller 18. The data signal 30 is an analog signal in which voltage level or electrical current level indicates the magnitude of light that has struck the cells of the imaging array 12 that are selected by the control and clock signals 36. The CCD controller 18 generates the control and clock signals 36 so as to scan out successive pixels of the imaging array 12. The entire sequence of pixels scanned out of the imaging array 12 and carried by the data signal 30 may be referred to as a data frame and each pixel interval in a data frame provides a pixel data sample for the CCD controller 18.

The black pixel synthesizer 14 generates an output signal 32 in response to the data signal 30 and the control and clock signals 36. The output signal 32 provides a scan line for the CCD controller 18 that includes the data frame scanned out from the imaging array 12 along with some synthesized black pixels that are needed for the proper functioning of the CCD controller 18.

The black pixel synthesizer 14 positions the synthesized black pixels in the output signal 32 with respect to the data frame in the output signal 32 depending upon the requirements of the CCD controller 18. For example, the CCD controller 18 may need black pixels at the start of a scan line in which case the output signal 32 carries the synthesized black pixels followed by the data frame. On the other hand, the CCD controller 18 may need black pixels at the end of a scan line in which case the output signal 32 carries the data frame followed by the synthesized black level pixels. In other embodiments, it is conceivable that the synthesized black pixels may be positioned somewhere in between the start and the end of a scan line.

In addition, the number of synthesized black pixels generated by the black pixel synthesizer 14 depends upon the requirements of the CCD controller 18. For example, the CCD controller 18 may require 3 black pixels at the start of a scan line and the black pixel synthesizer 14 generates 3 synthesized black pixels accordingly.

The number of black pixels generated by the black pixel synthesizer 14 may be programmable. In addition, the position of the black pixels within a scan line may be programmable.

The imaging system 10 includes a signal processing circuit 16 that matches the output signal 32 to the specifications of an input 34 to the CCD controller 18. For example, the signal processing circuit 16 may perform an amplification function to adjust the voltage or current range of the output signal 32 to an appropriate range needed to drive the input 34. Additionally, the signal processing circuit 16 may perform analog-to-digital conversion of the output signal 32 if the input 34 is a digital input. Alternatively, the analog-to-digital function may be implemented in the CCD controller 18.

The CCD controller 18 communicates with, for example, a processor (not shown) via a communication path 20. The communication path 20 may be a bus with which the processor obtains digitized samples of the an image after processing by the CCD controller 18. The processor 20 may also program a set of predetermined parameters for the CCD controller 18 such as the number of pixels in a scan line and/or the number of black pixels and/or the position of the black pixels in a scan line, etc.

Figure 2:
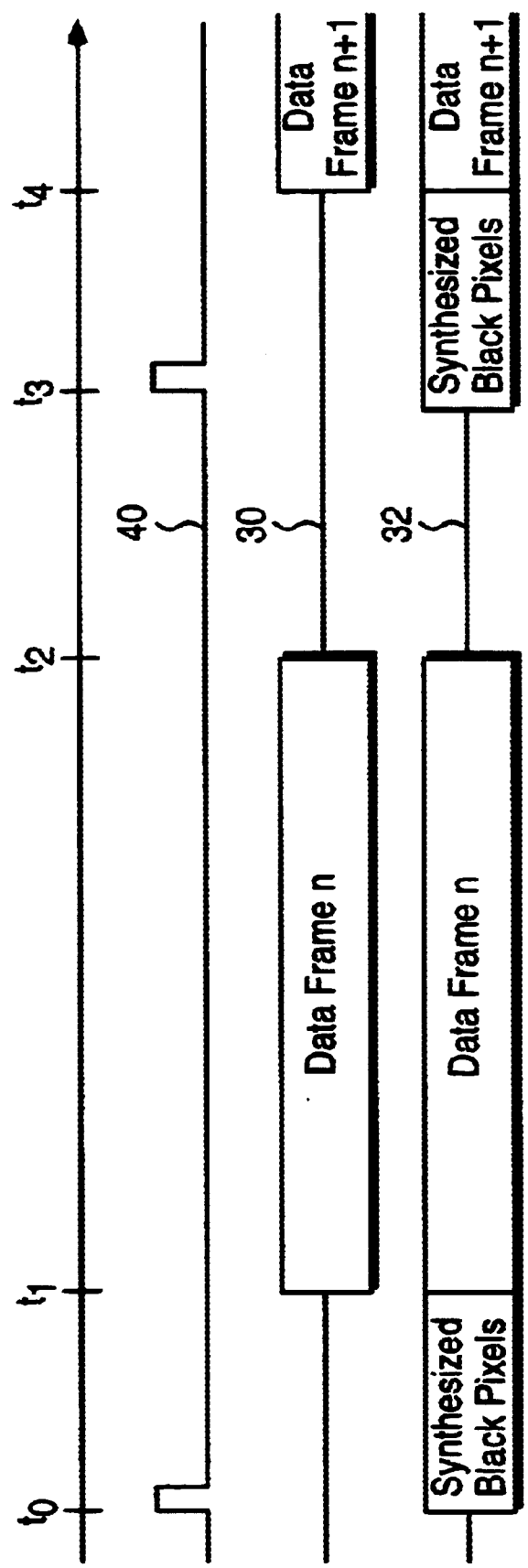
FIG. 2 shows an output signal from the black pixel synthesizer in response to the data signal from the imaging array and a start scan signal from the CCD controller.

FIG. 2 shows the output signal 32 in response to the data signal 30 from the imaging array 12 and a start scan signal 40 from the CCD controller 18. The start scan signal 40 is one of the control and clock signals 36.

At time t0, an edge of the start scan signal 40 causes circuitry in the imaging array 12 to begin scanning out the sensor signals from the individual cells. The start scan signal 40 also causes the black pixel synthesizer 14 to generate synthesized black pixels on the output signal 32. The synthesized black pixels are carried in the output signal 32 starting at time t0 through to time t1. The length of the interval to through t1 depends on the number of black pixels needed by the CCD controller 18 and the time interval in which the clock and control signals 36 scan out a single pixel from the imaging array 12.

At time t1, the output signal 32 carries the data frame n carried by the data signal 30. The data frame n in the output signal 32 continues to time t2. A subsequent data frame n+1 with preceding synthesized black pixels begins at time t3.

In this example, the appropriate number of synthesized black pixels fits into the interval from t0 to t1. If fewer black pixels are needed then the start of transmission of the synthesized black pixels in the output signal 32 may be delayed past t0 as appropriate. If more black pixels are needed then the start of the data frame n may be delayed past time t1 until all the needed synthesized black pixels have been transferred.

Figure 3:
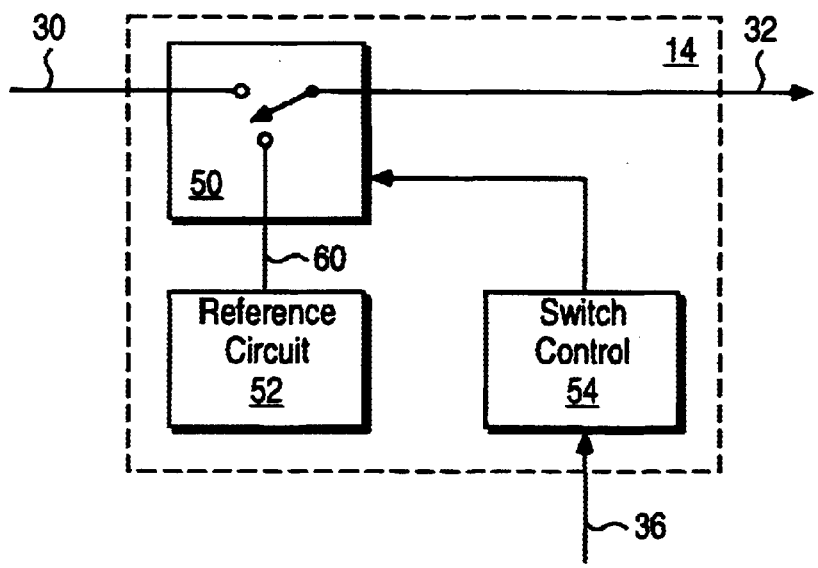
FIG. 3 illustrates one embodiment of the black pixel synthesizer.

FIG. 3 illustrates one embodiment of the black pixel synthesizer 14. The black pixel synthesizer 14 includes a reference circuit 52 that generates a reference voltage 60. The reference voltage 60 is provided to a switch 50 which is a solid-state switch. The switch 50 switches between the data signal 30 from the imaging array 12 and the reference voltage 60 under control of a switch control circuit 54.

The magnitude and sign of the reference voltage 60 is preselected to match the black level characteristics of the cells of the imaging array 12. For example, the manufacturer of the imaging array 12 may provide characteristic curves that enable a determination of an appropriate level for the reference voltage 60. The reference voltage 60 is selected to simulate the voltage generated by a cell in the imaging array 12 when it is not illuminated.

The switch control circuit 54 throws the switch 40 in response to the clock and control signals 36. The start scan signal 40 causes the switch control circuit 54 to switch to the reference voltage 60. This provides the synthesized black pixels during the interval between times t0 and t1. At time t1, the switch control circuit 54 throws the switch 40 to switch to the data signal 30.

The reference circuit 52 in one embodiment is a voltage source for generating the reference voltage 60 with the appropriate characteristics that represent black pixels from the imaging array 12. In an alternative embodiment, the reference circuit 52 is a current source that generates a reference electrical current. This is appropriate for an embodiment in which magnitude of light that strikes the cells of the imaging array 12 is indicated by the electrical current level of the data signal 30. The current source embodied in the reference circuit 52 generates the reference current 60 with the appropriate characteristics such as magnitude and direction that represent black pixels from the imaging array 12.

The present techniques may be readily adapted to imaging systems in which an array controller is adapted to a different number of black cells than is produced by an imaging array. For example, the imaging array 12 may produce one black cell in a scan line and the array controller 18 may be adapted to three black cells per scan line. The black pixel synthesizer 14 synthesizes the two additional black cells and may reposition the black cells in the scan line as needed. In another example, the imaging array 12 may produce two black cells in a scan line and the array controller 18 may be adapted to one black cells per scan line. The black pixel synthesizer 14 removes the extra black cell and may reposition the black cell within the scan line as needed.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An imaging system, comprising:
   controller that is adapted to process a scan line from an imaging array having a set of black cells that are not exposed to incident light;
   circuit for adapting the controller to an imaging array not having the black cells by synthesizing a set of black pixel samples into a scan line generated by the imaging array not having the black cells.

2. The imaging system of claim 1, wherein the circuit generates the scan line such that the black pixel samples precede one or more of a set of pixel data samples from the imaging array not having the black cells in the scan line.

3. The imaging system of claim 1, wherein the circuit generates the scan line such that the black pixel samples follow one or more of a set of pixel data samples from the imaging array not having the black cells in the scan line.

4. The imaging system of claim 1, wherein the controller is a charge-coupled device controller.

5. The imaging system of claim 1, wherein the circuit comprises:
   circuitry for generating a signal that represents the black pixel samples;

circuit for combining a signal that carries a series of pixel data samples from the imaging array not having the black cells with the signal that represents the black pixel samples.

6. The imaging system of claim 5, wherein the circuit for generating a signal that represents the black pixel samples comprises a voltage source that generates a reference voltage that is preselected to simulate a voltage generated by the black cells.

7. The imaging system of claim 5, wherein the circuit for generating a signal that represents the black pixel samples comprises a current source that generates a reference current that is preselected to simulate a current generated by the black cells.

8. The imaging system of claim 1, wherein the imaging array not having the black cells is a contact image sensor.

9. A method for adapting an array controller that is adapted to an imaging array having a set of black cells that are not exposed to incident light for use with an imaging array not having the black cells, comprising the steps of:

obtaining a scan line from the imaging array not having the black cells;

synthesizing a set of black pixel samples into the scan line.

10. The method of claim 9, wherein the step of synthesizing comprises the step of synthesizing the black pixel samples such that the black pixel samples precede one or more of a set of pixel data samples in the scan line.

11. The method of claim 9, wherein the step of synthesizing comprises the step of synthesizing the black pixel samples such that such that the black pixel samples follow one or more of a set of pixel data samples in the scan line.

12. The method of claim 9, wherein the step of synthesizing comprises the steps of:

generating a signal that represents the black pixel samples;

combining a signal that carries a set of pixel data samples from the imaging array not having the black cells with the signal that represents the black pixel samples.

13. The method of claim 12, wherein the step of generating a signal that represents the black pixel samples comprises the step of generating a reference voltage that is preselected to simulate a voltage generated by the black cells.

14. The method of claim 12, wherein the step of generating a signal that represents the black pixel samples comprises the step of generating a reference current that is preselected to simulate a current generated by the black cells.

15. An apparatus for adapting an array controller that is adapted to an imaging array having a set of black cells that are not exposed to incident light for use with an imaging array not having the black cells, comprising:

means for obtaining a scan line from the imaging array not having the black cells;

means for synthesizing a set of black pixel samples into the scan line.

16. The apparatus of claim 15, wherein the means for synthesizing comprises means for synthesizing the black pixel samples such that the black pixel samples precede one or more of a set of pixel data samples in the scan line.

17. The apparatus of claim 15, wherein the means for synthesizing comprises means for synthesizing the black pixel samples such that such that the black pixel samples follow one or more of a set of pixel data samples in the scan line.

18. The apparatus of claim 15, wherein the means for synthesizing comprises:

means for generating a signal that represents the black pixel samples;

means for combining a signal that carries a set of pixel data samples from the imaging array not having the black cells with the signal that represents the black pixel samples.

19. The apparatus of claim 18, wherein the means for generating a signal that represents the black pixel samples comprises means for generating a reference voltage that is preselected to simulate a voltage generated by the black cells.

20. The apparatus of claim 18, wherein the means for generating a signal that represents the black pixel samples comprises means for generating a reference current that is preselected to simulate a current generated by the black cells.

21. An imaging system, comprising:

controller that is adapted to process a scan line from an imaging array having a first number of black cells that are not exposed to incident light;

circuit for adapting the controller to an imaging array having a second number of black cells by synthesizing a set of black pixel samples into a scan line generated by the imaging array having the second number of black cells if the first number is greater than the second number and by removing one or more samples of black cells from the scan line if the first number is less than the second number.

22. The imaging system of claim 21, wherein the circuit generates the scan line such that the black pixel samples precede one or more of a set of pixel data samples in the scan line.

23. The imaging system of claim 21, wherein the circuit generates the scan line such that the black pixel samples follow one or more of a set of pixel data samples in the scan line.

24. The imaging system of claim 21, wherein the controller is a charge-coupled device controller.

25. A method for adapting an array controller that is adapted to an imaging array having a first number of black cells that are not exposed to incident light for use with an imaging array having a second number of black cells, comprising the steps of:

obtaining a scan line from the imaging array having the second number of black cells;

synthesizing a set of black pixel samples into the scan line if the first number is greater than the second number and removing one or more samples of the black cells from the scan line if the first number is less than the second number.

26. The method of claim 25, wherein the step of synthesizing comprises the step of synthesizing the black pixel samples such that the black pixel samples precede one or more of a set of pixel data samples in the scan line.

27. The method of claim 25, wherein the step of synthesizing comprises the step of synthesizing the black pixel samples such that such that the black pixel samples follow one or more of a set of pixel data samples in the scan line.

28. The method of claim 25, wherein the controller is a charge-coupled device controller.

* * * * *